(12) United States Patent
Matthias et al.

(10) Patent No.: US 6,435,058 B1
(45) Date of Patent: Aug. 20, 2002

(54) ROTARY DRILL BIT DESIGN METHOD

(75) Inventors: Terry R. Matthias, Upton St. Leonards; Nigel Dennis Griffin, Nympsfield; Peter Raymond Hughes, Stroud, all of (GB)

(73) Assignee: Camco International (UK) Limited (GB)

( * ) Notice: Subject to any disclaimer, the term of this patent is extended or adjusted under 35 U.S.C. 154(b) by 0 days.

(21) Appl. No.: 09/682,466

(22) Filed: Sep. 6, 2001

Related U.S. Application Data

(60) Provisional application No. 60/234,075, filed on Sep. 20, 2000, and provisional application No. 60/281,054, filed on Apr. 2, 2001.

(51) Int. Cl.$^7$ .......................... B21K 5/04; E21B 10/00
(52) U.S. Cl. ................................................ 76/108.2
(58) Field of Search ...................... 76/108.2, 108.4, 76/108

(56) References Cited

U.S. PATENT DOCUMENTS

| 5,607,024 A | 3/1997 | Keith et al. |
| 5,833,021 A | 11/1998 | Mensa-Wilmot |
| 5,960,896 A | * 10/1999 | Barr et al. .................. 76/108.2 |
| 6,021,859 A | 2/2000 | Tibbits et al. |

FOREIGN PATENT DOCUMENTS

| EP | 0 462 955 B1 | 6/1991 |
| EP | 0 554 568 A3 | 8/1993 |
| EP | 0 546 725 A | 9/1996 |
| GB | 2 161 849 A | 1/1986 |
| GB | 2 261 894 A | 6/1993 |
| GB | 2 285 823 A | 7/1995 |
| GB | 2 292 163 A | 2/1996 |
| GB | 2 294 712 A | 5/1996 |
| GB | 2 298 668 A | 9/1996 |
| GB | 2 300 208 A | 10/1996 |
| GB | 2 317 195 A | 3/1998 |
| WO | WO 00/28106 A1 | 5/2000 |

OTHER PUBLICATIONS

European Search Report, EP 01 30 7739, "Documents Considered to be Relevant," Feb. 18, 2002.

* cited by examiner

Primary Examiner—Douglas D Watts
(74) Attorney, Agent, or Firm—Jeffery E. Daly

(57) ABSTRACT

A method for use in designing rotary drill bits comprises determining locations in which cutters are to be provided, determining likely wear rates for cutters positioned at those locations, and using the likely wear rates to chose between relatively high and relatively low wear rate cutters for each location. The cutters all have substantially the same impact toughness.

11 Claims, 3 Drawing Sheets

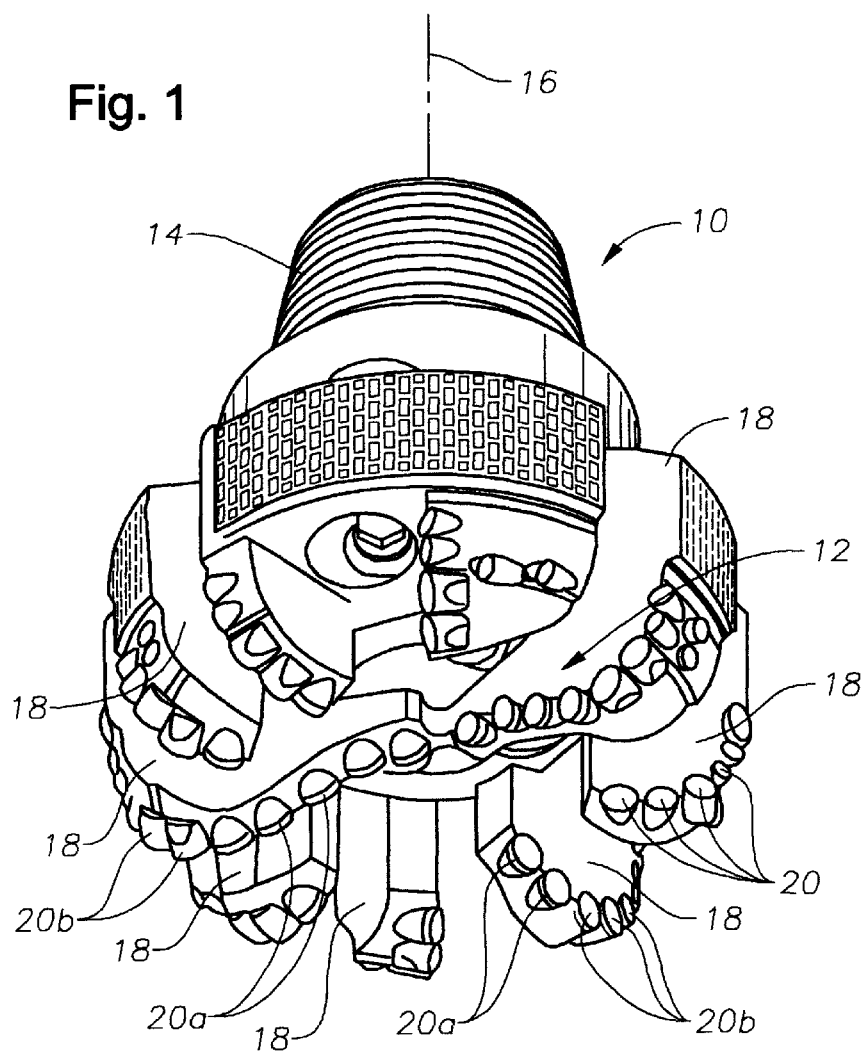
Fig. 1
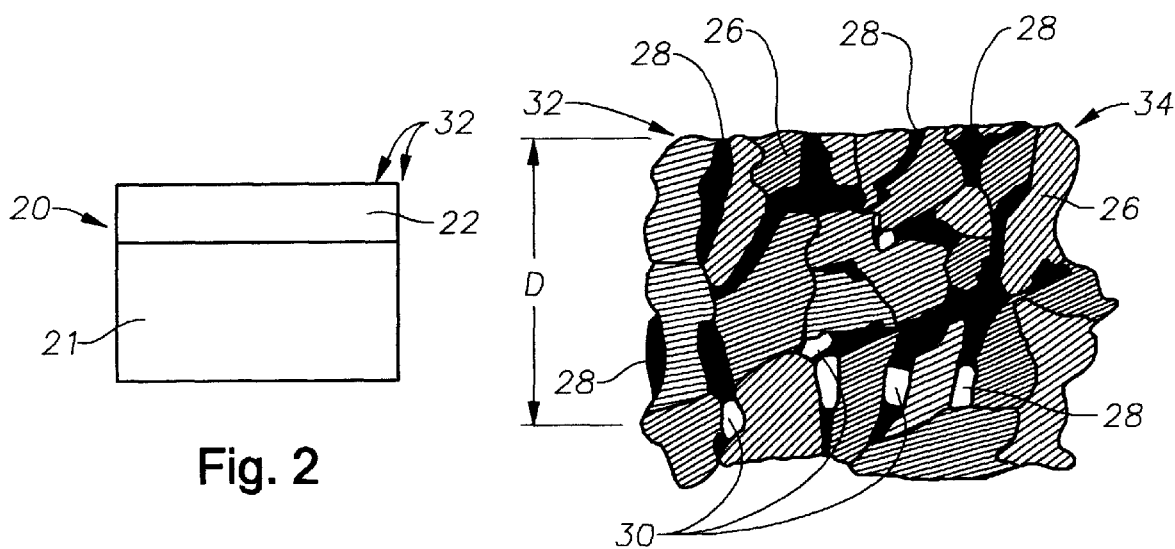
Fig. 2
Fig. 3

ROTARY DRILL BIT DESIGN METHOD

CROSS REFERENCE TO RELATED APPLICATIONS

This application claims priority from U.S. Provisional Patent Application No. 60/234,075 filed Sep. 20, 2000, and from U.S. Provisional Patent Application No. 60/281,054 filed Apr. 2, 2001.

BACKGROUND OF INVENTION

1. Field of the Invention

This invention relates to a method of designing a fixed cutter rotary drill bit for use in the drilling of wellbores.

2. Description of the Related Art

It is known that certain parts of a fixed cutter rotary drill bit wear at a faster rate than other parts thereof. Such variations in wear have been countered, in the past, by providing the drill bit with additional cutters in the high wear areas thereof. In the past, drill bit designs were compromised because cutters having high abrasion resistance had low impact toughness and cutters having high impact toughness had low abrasion resistance. As a result of this trade-off such placement of the cutters may improve the abrasion resistance of the drill bit, but it is likely that the overall drilling efficiency is not optimized due to relatively poor impact toughness.

It is an object of the invention to provide a drill bit whereby the operating efficiency of the bit can be maintained whilst providing a bit having a desired wear profile, and to provide a method for designing such a drill bit and provide high abrasion resistance while maintaining impact toughness.

SUMMARY OF INVENTION

According to the present invention there is provided a method for designing a fixed cutter drill bit comprising determining a layout of cutter locations in which cutters are to be positioned upon a bit body, determining the likely wear rate for at least the cutters provided in some of the cutter locations and using the determined likely wear rates to determine whether to mount a cutter of a first type of relatively low abrasion resistance or a cutter of a second type of a relatively high abrasion resistance in each cutter location. The impact toughness of all the cutters is substantially the same.

The method of the invention is advantageous in that the positions of the cutter locations can be optimized whilst achieving an acceptable overall wear rate for the bit.

The cutters of the second type conveniently each comprise a table of polycrystalline diamond bonded to a substrate, the table of polycrystalline diamond defining a matrix of interstices containing a catalyzing material, the interstices of the matrix located within a volume close to a working surface of the cutter being substantially free of catalysing material. The volume preferably extends to a depth of at least around 0.25 mm from the working surface.

According to another aspect of the invention there is provided a method of designing a fixed cutter drill bit comprising determining a layout of cutter locations in which cutters are to be positioned upon a bit body, determining a likely wear rate for at least the cutters provided at some of the cutter locations, selecting a desired wear profile for the bit, and using the determined likely wear rates to determine the abrasion resistance of the cutter to be mounted at each cutter location to achieve the desired wear profile.

The invention also relates to a fixed cutter drill bit designed in accordance with the methods defined hereinbefore.

BRIEF DESCRIPTION OF DRAWINGS

The invention will further be described, by way of example, with reference to the accompanying drawings.

FIG. 1 is a perspective view of a drill bit designed in accordance with an embodiment of the invention.

FIG. 2 is a diagrammatic sectional view of a cutter of the drill bit of FIG. 1.

FIG. 3 is a diagrammatic view illustrating the structure of part of the cutters of FIG. 2.

DETAILED DESCRIPTION

Figure 4:
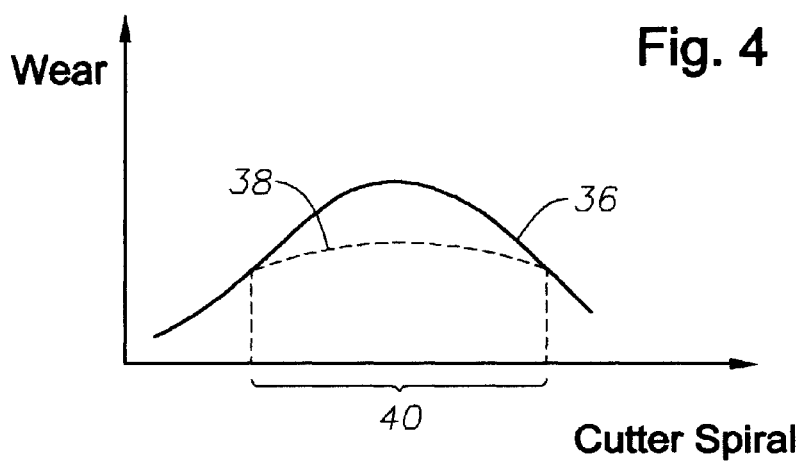
FIGS. 4 to 7 are diagrammatic representations of wear profiles.

The fixed cutter drill bit illustrated in FIG. 1 comprises a bit body 10 having a leading face 12 and a shank 14 to permit the drill bit to be secured to the remainder of a drill string. The bit body 10 is intended to be rotated, in use, about an axis of rotation 16.

Upstanding from the leading face 12 are a plurality of blades 18 upon which a plurality of cutters 20 are mounted. As shown in FIG. 2, each cutter 20 comprises a table 22 of polycrystalline diamond bonded to a tungsten carbide substrate 24. Each cutter 20 is manufactured using a known technique involving exposing diamond powder, a catalyst material and a tungsten carbide substrate to high temperature, high pressure conditions to cause the diamond powder to undergo a structural change, becoming polycrystalline diamond, and to cause the polycrystalline diamond to bond to the substrate.

It has been found that where the catalyzing material used in the manufacture of the cutters is cobalt, removal of the catalyst material from a part of the cutter close to a working surface thereof results in the abrasion resistance of the cutter improving. FIG. 3 illustrates part of a cutter so treated. In FIG. 3, the polycrystalline diamond 26 defines a matrix of interstices 28 containing the catalyzing material used in the formation of the polycrystalline diamond and used in the bonding of the polycrystalline diamond to the substrate. The interstices 28 located within a volume 34 close to a working surface 32 of the diamond 26 have been rendered substantially free of catalyzing material 30 by leaching the catalyzing material 30 from the volume 34. In the arrangement of FIG. 3, the volume 34 extends over the full cross-sectional area of the polycrystalline diamond, and extends to a depth D of approximately 0.25 mm from the working surface 32.

Although leaching is the currently preferred technique for rendering the interstices free of catalyzing material, other techniques may be used. For example, the catalyzing material may be forced to undergo a structural change to take an alternative form which does not have a catalyzing effect, or may be chemically reacted to form a substance which does not have a catalyzing effect.

In accordance with the invention, a layout or arrangement of cutter locations in which the cutters 20 are to be mounted on the bit body 10 is chosen, and the likely wear rate to which each of the cutters 20 is to be exposed is determined. The likely wear rate for each location may be determined using, for example, a computer modelling technique, or alternatively may be derived from measurements taken from a similar, used drill bit. Using the determined likely wear rate information, either a cutter 20a of a first type of a relatively low abrasion resistance, or a cutter 20b of a second type having a relatively high abrasion resistance manufactured as described hereinbefore is chosen for each cutter location in order to achieve a desired wear profile.

Figure 5:
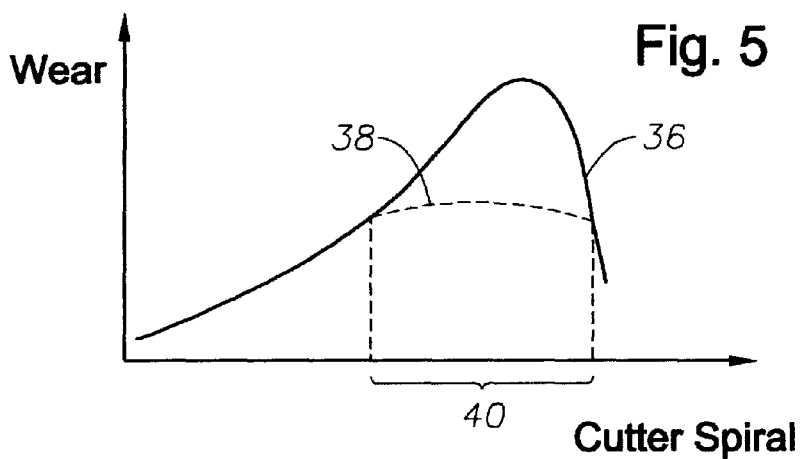

FIGS. 4 to 7 illustrate a range of possible profiles. In each drawing, the full line 36 denotes the profile that would be achieved if all cutter locations were occupied by cutters 20a of the first type. In FIGS. 4 and 5, the broken line 38 illustrates the modification to the wear profile achieved by using cutters 20b of the second type rather than cutters 20a of the first type in a region 40 of the bit.

Figure 6:
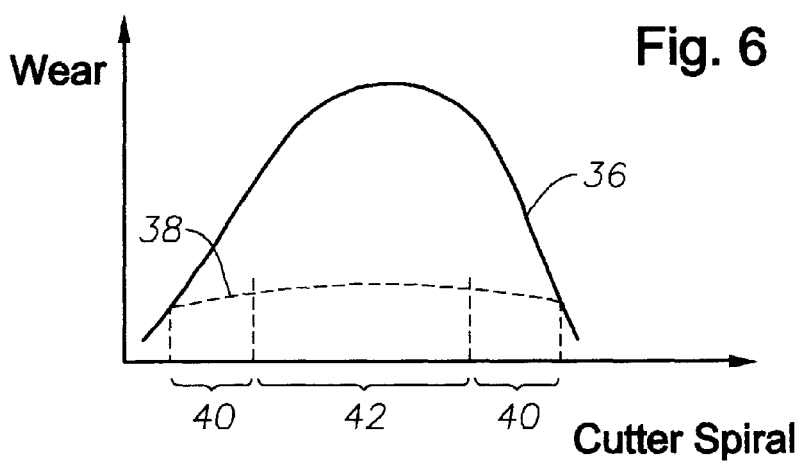

FIG. 6 illustrates an arrangement which makes use of cutters of a third type of higher abrasion resistance than the cutters 20b of the second type. These cutters are similar to the cutters 20b of the second type but are treated to remove the catalyst material to a greater depth, for example to a depth of 0.5 mm, from the working surface. In FIG. 6, the cutters 20b of the second type are located in regions 40 and the cutters of the third type are location in a region 42.

Figure 7:
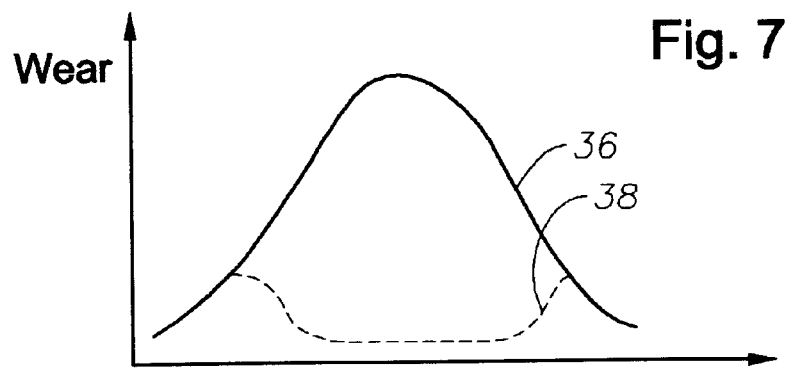

In the profiles of FIGS. 4 to 6, the use of cutters 20b of the second type, and in FIG. 6 the use of cutters of the third type, serves to flatten the profile, increasing the uniformity with which the cutters on the bit wear, thereby permitting the working life of the bit to be increased. FIG. 7 illustrates an alternative profile for a bit where the region which conventionally would have the highest wear rate has a lower wear rate than the remainder of the bit. It is thought that this may be beneficial in providing bits of good stability, directional control, and rate of progress.

Figure 8:
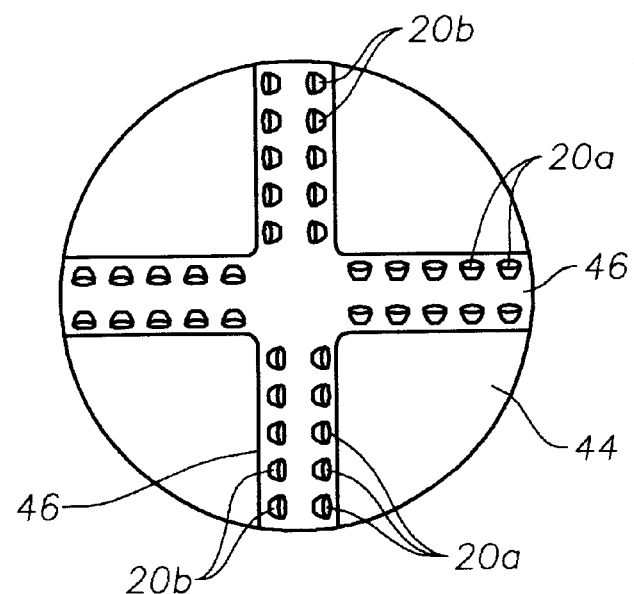
FIGS. 8 and 9 are diagrammatic views of two further drill bits.
Figure 9:
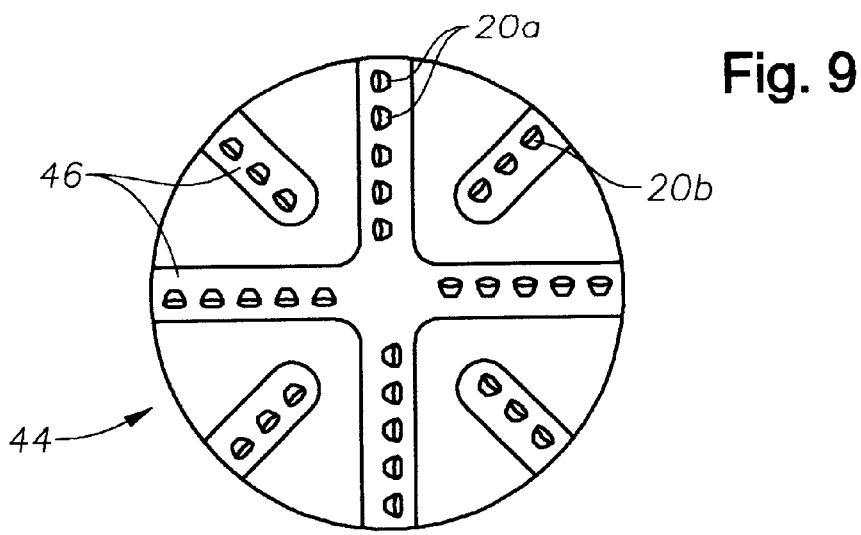

In the hereinbefore described manufacturing process for improving wear resistance, as the wear resistance of a cutter improves, its ability to withstand impacts is substantially retained. However, because a thin wear-resistance lip is often desirously formed at the cutting edge cutters of the second and third types, they may be more suitably used in in cutter locations which are protected against impact. This is because the lip, which is believed to increase drilling efficiency, may become chipped during impact. FIGS. 8 and 9 illustrate, diagrammatically, two rotary drill bits of the type having a plurality of primary cutters and a plurality of secondary cutters, the secondary cutters being protected, at least to some extend, against chippage of the lip by the presence of the primary cutters.

In FIG. 8, the drill bit 44 defines a plurality of blades 46, each blade 46 having mounted thereon a plurality of cutters 20. The cutters 20 are arranged in two rows 48, 50 on each blade 46. The first row 48 comprises a row of primary cutters 20a of the first type. The second row 50 comprises secondary cutters 20b of the second type. The secondary cutters are each provided immediately behind an associated primary cutter, and so are protected by the primary cutters from impacts.

The arrangement of FIG. 9 differs from that of FIG. 8 in that the secondary cutters are mounted upon separate blades from the primary cutters.

It will be appreciated that, in order to provide a bit of good abrasion resistance and good impact resistance, it may in some circumstances be desirable to position some cutters of the first type within the regions 40, 42 of FIGS. 4 to 7 to protect the cutters of the second type from lip chippage.

Although specific embodiments of the invention have been described hereinbefore, it will be appreciated that various changes may be made without departing from the scope of the appended claims. The present invention has also been described in particular relation to the drawings attached hereto, it should be understood that other and further modifications apart from those shown or suggested herein, may be made within the scope and spirit of the present invention.

What is claimed is:

1. A method of designing a fixed cutter drill bit comprising determining a layout of cutter locations in which cutters are to be positioned upon a bit body, determining a likely wear rate for at least the cutters provided at some of the cutter locations, selecting a desired wear profile for the bit, and using the determined likely wear rates to determine the abrasion resistance of the cutter to be mounted at each cutter location to achieve the desired wear profile, wherein all the cutters have substantially the same impact toughness and wherein the desired wear profile is of generally flat form.

2. A method of claim 1, wherein the desired wear profile includes a region of relatively low rate bounded by regions of higher wear rates.

3. A method according to claim 1, wherein a first type of cutters to be mounted at a first one of said cutter locations has a relatively low abrasion resistance and a second type of cutter to be mounted at a second one of said cutter locations has a relatively high abrasion resistance.

4. A method according to claim 3, wherein the cutter of the second type comprises a table of polycrystalline diamond bonded to a substrate, the table of polycrystalline diamond defining a matrix of interstices containing a catalyzing material, the interstices of the matrix located within a volume close to a working surface of the cutter being substantially free of catalyzing material.

5. A method according to claim 4, wherein the volume close to the working surface extends to a depth of at least about 0.25 mm from the working surface.

6. A method according to claim 5, wherein the volume close to the working surface extends to a depth of at least about 0.5 mm from working surface.

7. A method of designing a fixed cutter drill bit comprising determining a layout of cutter locations in which cutters are to be positioned upon a bit body, determining a likely wear rate for at least the cutters provided at some of the cutter locations, selecting a desired wear profile for the bit, and using the determined likely wear rates to determine the abrasion resistance of the cutter to be mounted at each cutter location to achieve the desired wear profile, wherein all the cutters have substantially the same impact toughness and wherein the desired wear profile includes a region of relatively low wear rate bounded by regions of higher wear rates.

8. A method according to claim 7, wherein a first type of cutter to be mounted at a first one of said cutter locations has a relatively low abrasion resistance and a second type of cutter to be mounted at a second one of said locations has a relatively high abrasion resistance.

9. A method according to claim 8, wherein the cutter of the second type comprises a table of polycrystalline diamond bonded to a substrate, the table of polycrystalline diamond defining a matrix of interstices containing a catalyzing material, the interstices of the matrix located within a volume close to a working surface of the cutter being substantially free of catalyzing material.

10. A method of claim 9, wherein the volume close to the working surface extends to a depth of at least about 0.25 mm from the working surface.

11. A method according to claim 10, wherein the volume close to the working surface extends to a depth of at least about 0.5 mm from the working surface.

* * * * *